United States Patent
Nussbächer et al.

(10) Patent No.: US 8,363,042 B2
(45) Date of Patent: *Jan. 29, 2013

(54) PHOTON TRANSFER CURVE TEST TIME REDUCTION

(75) Inventors: Mark Nussbächer, Kirchheim Teck (DE); Giuseppe D'onofrio, Boise, ID (US)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 820 days.

This patent is subject to a terminal disclaimer.

(21) Appl. No.: 11/784,075

(22) Filed: Apr. 5, 2007

(65) Prior Publication Data
US 2008/0243419 A1    Oct. 2, 2008

(30) Foreign Application Priority Data

Mar. 28, 2007    (EP) .................................... 07392002

(51) Int. Cl.
*G06F 3/038*    (2006.01)
(52) U.S. Cl. ........ 345/207; 345/166; 348/180; 348/187; 348/243; 250/200; 250/553; 702/117
(58) Field of Classification Search .................. 345/207, 345/76, 166; 348/187, E17, 2, 308, 180, 348/243; 702/117; 250/200, 553
See application file for complete search history.

(56) References Cited

U.S. PATENT DOCUMENTS

| | | | |
|---|---|---|---|
| 5,594,273 A | 1/1997 | Dasse et al. | |
| 5,955,753 A * | 9/1999 | Takahashi | 257/292 |
| 6,326,230 B1 | 12/2001 | Pain et al. | |
| 6,765,610 B1 * | 7/2004 | Nakamura | 348/222.1 |
| 6,774,893 B2 | 8/2004 | Debiez et al. | |
| 7,847,821 B2 * | 12/2010 | Nussbacher | 348/187 |
| 2005/0001142 A1 | 1/2005 | Lauffenburger et al. | |
| 2006/0038109 A1 * | 2/2006 | Kinney et al. | 250/208.1 |
| 2006/0038916 A1 * | 2/2006 | Knoedgen et al. | 348/371 |
| 2008/0106602 A1 * | 5/2008 | Nussbacher | 348/187 |

FOREIGN PATENT DOCUMENTS
EP    07392002.7-1241    9/2007

OTHER PUBLICATIONS

Co-pending U.S. Appl. No. 11/594,292, filed Nov. 8, 2006, "On Chip Test Mode Implementation", Assigned to the Same Assignee as the Present Invention.

* cited by examiner

*Primary Examiner* — Lun-Yi Lao
*Assistant Examiner* — Olga Merkoulova
(74) *Attorney, Agent, or Firm* — Saile Ackerman LLC; Stephen B. Ackerman (57) ABSTRACT

An improved method for photon transfer curve (PTC) testing in an image sensor is described. A cost and time savings is achieved by reducing the number of frames necessary for measurements to two that are generated by illuminating a first plurality of pixel rows at a first intensity level $m_1$, a second plurality of pixel rows at a second intensity level $t_2$, and so forth up to an nth plurality of pixel rows illuminated at an nth intensity level $m_n$ where $m_n > m_2 > m_1$. The resulting image has "n" regions each with a different brightness. The highest intensity level essentially saturates the pixels in the nth region. In one example, a four row exposure and five intensity levels are employed in the illuminator sequence. An intelligent light source is pre-programmable with illumination intensity settings and is synchronized to the image sensor using HSYNC and VSYNC signals, for example.

20 Claims, 6 Drawing Sheets

PHOTON TRANSFER CURVE TEST TIME REDUCTION

RELATED PATENT APPLICATION

This application is related to the following: Ser. No. 11/594,492, filing date Nov. 8, 2006; assigned to a common assignee.

FIELD OF THE INVENTION

The invention relates to an improved method of testing pixels in a CMOS image sensor. In particular, the time required for photon transfer curve (PTC) testing is reduced by implementing a certain pre-programmable illumination sequence, and result stability is improved by utilizing more illumination levels.

BACKGROUND OF THE INVENTION

A complementary metal oxide semiconductor (CMOS) image sensor is a key component of many digital video cameras and other "high tech" devices. The CMOS image sensor is typically comprised of an upper stack that includes one or more layers of color filters and a microlens array, and a lower stack that includes interlevel dielectric layers, interlevel metal layers, and passivation layers that are formed on a substrate. The function of the microlens component is to focus incident light through a light column onto a sensing area (photodiode) at the base of the lower stack. The elementary unit of the image sensor is a pixel which is an addressable area element with intensity and color attributes related in large part to the spectral signal contrast obtained from the photon collection efficiency of the microlens array, light transmission through the color filters, microlenses, and other layers in the imaging path, and the spectral response and efficiency of the photodiode. A pixel converts incident radiation into a quantity of electrical charge that is related to the intensity of illumination. Output signals from a plurality of pixels are used by the image sensor device to generate a picture.

A plurality of pixels forms an array on the substrate wherein pixels sensitive to red light, blue light, or green light are evenly distributed. Ideally, all pixels of a certain color should afford the same output in terms of electrical charge when exposed to the same intensity of incident light. However, process variations during CMOS image sensor fabrication and other factors such as particle defects on the surface of the image sensor cause the output of certain pixels to vary either above or below the desired output range. If a large enough number of the pixels in the array fail to provide an acceptable output signal, the image sensor is rejected. Therefore, pixel arrays are typically tested while still on the chip and before the image sensor is incorporated into a larger device.

Testing is a major cost component of the final image sensor device because of the large number of pixels that must be tested, and the nature of the test which includes both optical and electrical methods. One important test is the so called photon transfer curve (PTC) test where the light sensitivity of an array of pixels in response to incident light is determined. The PTC characterizes the image sensor in many different ways. In order to calculate the read noise, the dynamic range, conversion gain, offset, offset fix pattern noise and the full well, it is necessary to grab frames with different exposure times at a certain illumination. The exposure time or integration time is usually named in number "s" of rows. One row exposure is equivalent to the number of pixels per row multiplied by clock frequency in microseconds. The illumination is chosen in a way such that the sensor reaches saturation (white image, maximum output level) at the longest exposure time.

During a conventional PTC test, a measured amount of broad band light that is highly uniform over the entire exposure field is directed at the pixel array through a point light source. Each pixel has a photo gate (photodiode) at the bottom of its light column that is pre-charged to a certain voltage level. During the time that pixels are exposed, the light photons discharge the photo gate and the intensity of light incident on the photo gate is related to the amount of discharge. The remaining voltage is transferred to a storage node (capacitor) where the voltage stays until the "pixel information" (voltage level) is read out. The read out time is related to exposure time. Normally, the test involves 5 to 10 different illumination levels (different illumination times) and each illumination requires two frames wherein a frame is defined as a certain number of lines (rows) of pixels from an array that consists of "m" rows and "n" columns of pixels. A typical exposure rate of 30 frames per second and the wait times between light intensity changes dictate that the total PTC testing time is about 6 seconds per device. Note that the sequence of illumination, voltage transfer to storage, and read out of data to a frame grabber and ultimately to an image processor can be performed simultaneously for different frames.

Since common light sources are not programmable and fast switching, it is generally not feasible with current test methods to vary the illumination (photon flux) during the frame. Changing the intensity of the light source from one illumination to the next is typically less accurate than changing the illumination level by varying the time for a fixed illumination. As a result, improvements in PTC and dark current test throughput are limited because of the multiple number of frames required in the standard test method. Therefore, a faster method of testing image sensors and one that has improved result stability is needed to reduce the cost associated with device fabrication.

In U.S. Pat. No. 6,774,893, a method for calibrating an array of light sources involves sequentially activating each light source, sampling light intensity to generate a plurality of intensity signals, and generating a normalized matrix of the plurality of signals.

U.S. Patent Application 2005/0001142 describes a regulation system for an optical sensing device that comprises timing the duration of an integration period or determining the rate of evolution of the integration signal, comparing this duration or rate of evolution with at least one reference value, and controlling the power of the light source as a function of the result of the comparison.

U.S. Pat. No. 5,594,273 discloses using a programmable light source in a stepper to program IC dies with identification codes.

U.S. Patent Application 2006/0038916 describes an "intelligent" light source that is pre-programmable and can be synchronized with a sensor device.

SUMMARY OF THE INVENTION

One objective of the present invention is to provide a method that reduces the time required for a PTC test on an image sensor device and thereby lower production cost.

A further objective of the present invention is to improve the result stability of the PTC test.

These objectives are achieved in one embodiment wherein a sensor area in an imaging device is comprised of a plurality of pixels arranged in "m" rows and "n" columns. The sensor area is tested by exposing with an illuminator that directs photons at the plurality of pixels. The illuminator is connected to a light source control in the tester apparatus used to perform the PTC test. The device being tested is also linked to other components of the tester including digital boards, a frame grabber, power supplies, and auxiliary instruments. The tester is controlled by an external tester control unit such as a computer that also functions as an image processor.

In a preferred sequence of events, the test comprises illuminating each row of pixels in the sensor area for a constant time but with varying illumination intensity. The light source processing memory that includes the various light intensities to be utilized during testing is preprogrammed before the test begins. The light source is connected to the sensor device data outputs with hardware such as a driver or buffer in between for signal refreshing and level shifting. The sensor is streaming out data together with pixel clock, horizontal and vertical (image) SYNC signals. When the test system (tester) is ready to acquire a special illuminated image, the light source is put into an "active mode" and waits for incoming SYNC signals from the sensor. The light source now becomes synchronized with the sensor device. When the light source sees the VSYNC changing from low to high, for example, it initiates the preprogrammed illumination sequence. Depending on the preprogrammed settings, the light source starts to count the number of occurring HYNC signals where the number of HYNC signals≧number of rows. The light source continues to change the illumination intensity according to the number of HYNC signals until the end of the preprogramming or until the VSYNC signal goes from high to low again, for example. Thus, the illumination is considered to originate with an "intelligent" light source.

In the exemplary embodiment, a first plurality of pixel rows is illuminated at a first intensity level, a second plurality of rows is illuminated at a second intensity level, a third plurality of rows is illuminated at a third intensity level, a fourth plurality of rows is illuminated at a fourth intensity level, and a fifth plurality of rows is illuminated at a fifth intensity level. Preferably, one of the intensity levels is sufficient to essentially saturate the pixels in the corresponding plurality of rows and one of the intensity levels is essentially zero and produces a substantially dark region in the resulting image. This process would result in a frame (image) that has regions of different brightness and progressively higher brightness involving four intensity steps moving from the top to the bottom of the frame, for example. Optionally, the number of intensity steps may be any integer greater than 1 and preferably greater than 4 if there are enough rows available in the sensor. If the sensor is relatively small and comprised of only about 100 rows or less, then at least 4 to 6 illumination steps are recommended. For larger sensors with about 1024 or more rows, then as many as 32 different intensity steps may be used and the number of rows involved in each illumination may be up to 32 or more.

In the exemplary embodiment, a programming sequence comprised of 4 rows exposure and four illumination steps is described. There are three rows of transition between each set of four rows at a different intensity level. For example, the first four rows are illuminated at a very low light intensity that is essentially zero. After row 4 illumination is stopped, row 5 is already illuminated to the dark for ¾th of its illumination time and is illuminated at a second light intensity level for only ¼th of its total illumination time. Row 6 is illuminated for one half of its illumination time to the dark and one half to the second light intensity level. Row 7 is illuminated for ¼th of its illumination time to the dark and ¾th to the second light intensity level. Rows 8 through 11 are all illuminated for a fixed time at the second intensity level. Thereafter, the jumps to the third, fourth, and fifth light intensity levels follow a similar sequence.

The photon transfer curve test comprises photons impinging on the photo gate of selected pixels and thereby discharging a pre-set voltage in proportion to the amount of incident light on the photo gate. The remaining voltage in the photo gate is transferred to a storage node (capacitor) in the imaging device. The voltage level for each pixel is obtained by a frame grabber component in the tester and is then read out line by line to an image processing unit. To calculate the PTC parameter, only two frames (F1 and F2) are necessary so that a difference frame (F2−F1) can be calculated in the image processing unit. Thus, a term called the difference_sigma (exp) can be determined by taking into account the difference for each pixel in F1 and F2. By employing the PTC test described herein, test throughput can be improved at least fivefold when five different illumination levels are involved because the number of frames (10 or more) required for conventional image sensor testing has been reduced to only two frames. In an embodiment where more than five intensity levels are used, test time reduction will be even greater than fivefold and a more accurate PTC result will be obtained than when only 5 illumination levels are employed.

DETAILED DESCRIPTION OF THE INVENTION

The present invention is a method of improving the throughput of the photon transfer curve (PTC) test when checking the reliability of pixels in an image sensor device. The drawings are provided by way of example and are not intended to limit the scope of the invention. The terms "light" and "illumination" may be used interchangeably.

The inventors have previously practiced a PTC test method wherein between five and ten different illumination levels involving varying illumination times and two frames each are used to provide PTC measurements. The present invention is directed toward an improved method of measuring illuminated frames and does not apply to dark current testing. A simplified method for dark current measurements is provided in related Dialog Imaging Systems application DI05-001 which is herein included by reference in its entirety.

Figure 1:
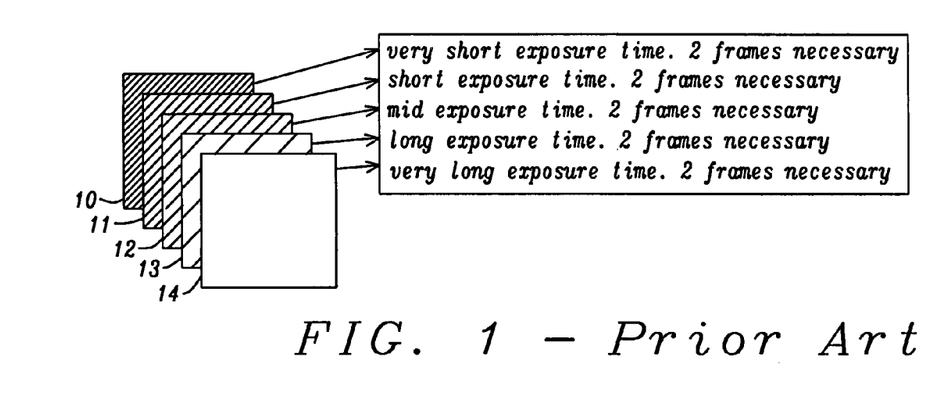
FIG. 1 is a diagram showing a conventional PTC test involving a set of five images generated with different illumination levels and two frames each in which the exposure time is uniform for each pixel row over the entire frame.

With regard to FIG. 1, images 10-14 resulting from five different illumination times (illumination levels) during a standard PTC test are illustrated. In other words, the illumination portion of the PTC test has been divided into steps such that each pair of two frames is uniformly illuminated for a certain time. The illumination time varies so that the brightness is different in each of the resulting five images 10-14. The frames may be illuminated in any order. In one step, a sensor area (not shown) having a plurality of pixels configured in "m" columns and "n" rows is illuminated for a first length of time ($a_1$) to produce an image 10 such that the output level of the sensor and each pixel is only a small fraction of the maximum output. Maximum output (14a in FIG. 2) is defined as the saturation point where a white image 14 is generated. In other steps, images 11, 12, 13 are produced by illuminating the plurality of pixels with increasingly greater illumination times $a_2$, $a_3$, and $a_4$, respectively, using the same intensity (photon flux) from an illuminator that is positioned to direct light at the sensor area. In a fifth step, a very long illumination time ($a_5$) is used to essentially saturate the sensor and produce an output that is a white image 14. Each step comprises generating a first frame at a certain illumination condition, resetting the photo gate to a precharged state, and then generating a second frame at the certain illumination condition. Two frames are averaged to give each image 10-14. Moreover, the remaining charge on the photo gate after each illumination period is transferred to a storage node (capacitor) where data can be read out pixel line (row) by pixel line (row) to an image processor where the pixel data is collected and an image is displayed.

Figure 2:
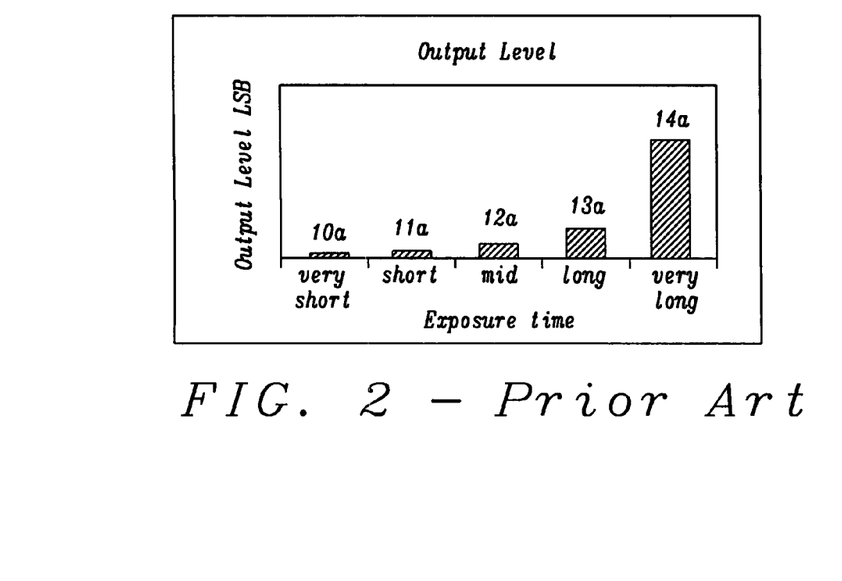
FIG. 2 is a bar graph showing the output level from each of the five different illumination levels in FIG. 1.

Referring to FIG. 2, the relative outputs 10a-14a used to generate the images 10-14, respectively, are depicted. Illumination times are usually in microseconds (μs) and may vary depending on the resolution and speed of the sensor.

Figure 3:
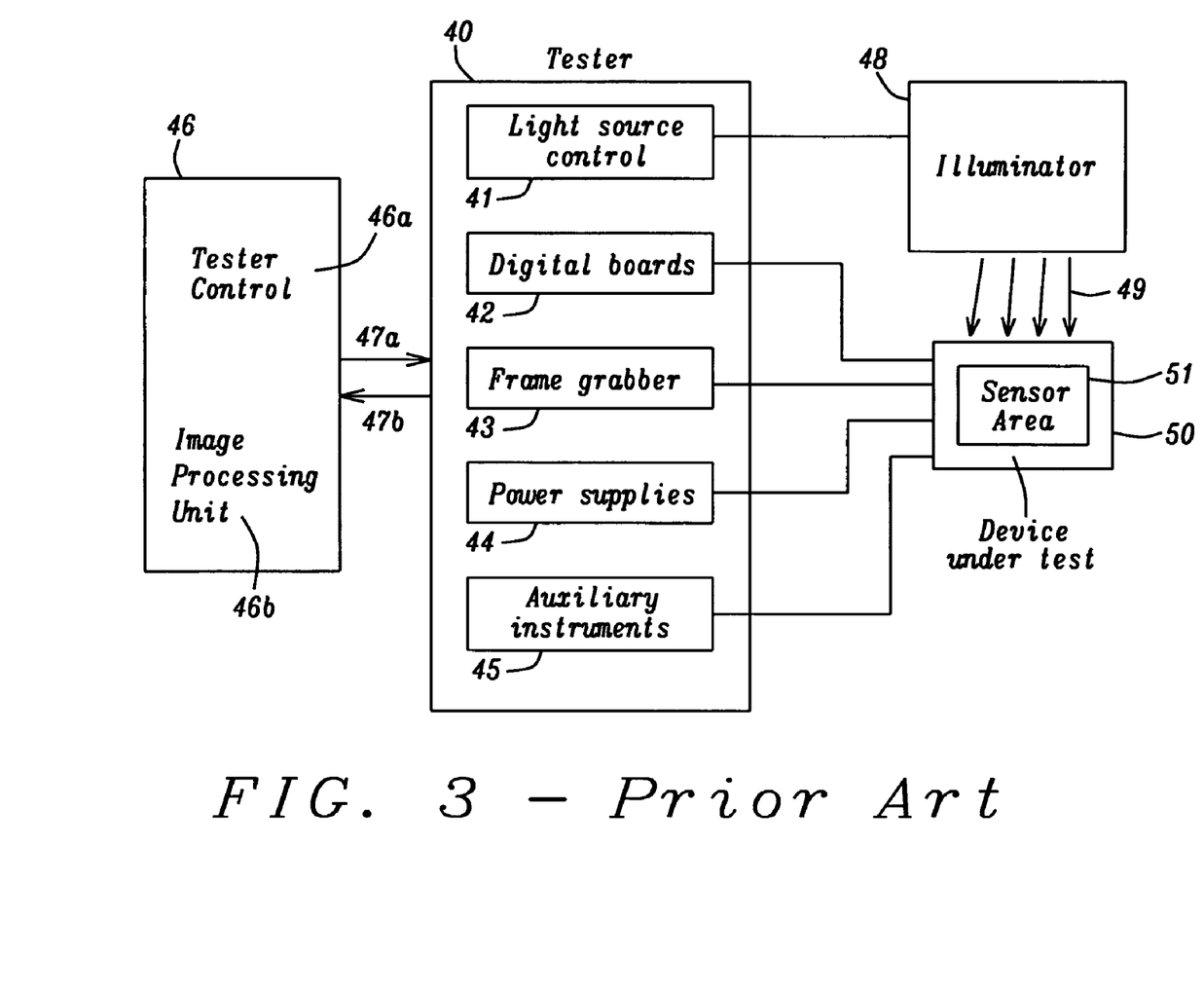
FIG. 3 is a block diagram that shows a test configuration that may be used to perform a PTC test on an image sensor device according to the present invention.

Referring to FIG. 3, the layout of a PTC test is depicted. A test system 40, dedicated for image sensor testing in general consists of a light source control 41, digital boards 42, a frame grabber 43, power supplies 44, and auxiliary instruments 45. The manufacturer and performance specifications may vary for each instrument from test system to test system. The light source control 41 is connected to an illuminator 48 based on LED illumination that emits broad band light 49 which exposes the sensor area 51 of a device 50 being tested. The charge remaining in a photo gate (not shown) of an illuminated pixel is transferred after each illumination to a storage capacitor (not shown) in the device 50 and is read out according to a certain protocol to a frame grabber as is understood by those skilled in the art. For example, if the illumination rate is 1 frame per $\frac{1}{30}$ of a second and each frame consists of "r" rows of pixels, then the read out rate of pixel information will be about 30r rows per second.

In one embodiment, the frame grabber 43 operates in a normal video mode such as a rolling shutter mode. The frame grabber 43 may start acquiring images based on synchronization signals such as VSYNC (vertical synchronization signal; start of frame/end of frame), HSYNC (horizontal synchronization, start of line, end of line), and Pixel clock (pixel data synchronization signal). Mainly parallel data are acquired on the data channels while HSYNC and VSYNC are "valid" (both together high or low—depending on the design). The frame grabber 43 collects the binary information of the parallel data channels and stores the information in data arrays that are essentially memory in a personal computer (PC) where the image processing algorithms can perform the calculations.

Digital boards 42 are used to communicate with the device and program registers, and set various states of the digital device pins such as enable pins, reset signals, snap shot start signal, and others as appreciated by those skilled in the art. The power supplies 44 serve to supply the device under test with the required voltages and currents. Auxiliary instruments 45 comprise wave form generators, time measurement units, relay matrix, and various other instruments which are mainly required to test the functionality of a device. Although auxiliary instruments are not required for the PTC test, they are used in the overall test flow that a sensor device must pass.

The tester control (test program) 46a inputs commands 47a such as execution of measurements, communication with the device, changing the state of pins, and activating the frame grabber 43 when the frame grabber is waiting for the HSYNC/VSYNC valid states to start the data acquisition to the tester 40. Image processing unit 46b receives input 47b such as a data array containing the binary information of the acquired image from the test system 40, or measurement results from the instrument that was used for data collection. In one aspect, the tester control 46a is essentially a test program that runs on a PC or a similar control unit. The image processing may be performed on the PC (process control unit 46) that runs the tester control 46a but it could also run on separate dedicated hardware such as a multi-processor unit that does massive parallel operations and calculations.

Figure 4:
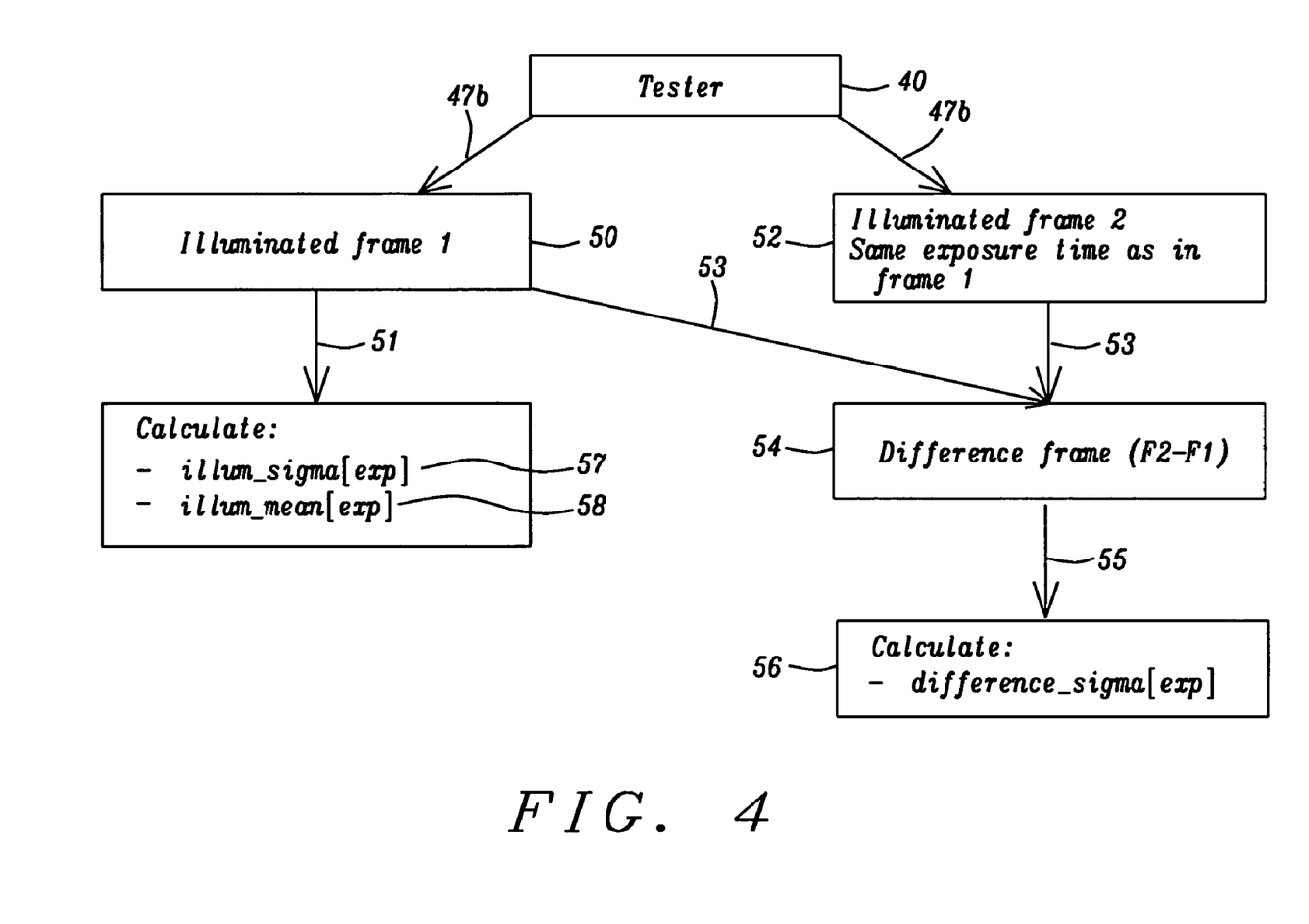
FIG. 4 is a flow diagram that shows how two frames from different illumination intensity levels may be used to calculate sigma, mean, and difference values.

In FIG. 4, a flow diagram illustrates how the process control unit 46 described previously uses input data 47b from the test system 40 to calculate values that characterize the sensor being tested. An illuminated frame 1 (F1) hereafter referred to as frame 50 is provided and data therein is processed in step 51 to calculate a sigma value shown as illum_sigma[exp] 57 and a mean value shown as illum_mean[exp] 58. A second illuminated frame 2 (F2) hereafter referred to as frame 52 is also provided. In step 53, frame 50 and frame 52 data are used to calculate a difference (F2−F1) frame 54. The difference frame 54 can be further used by a program known to those skilled in the art to calculate a sigma difference value 56 shown as difference_sigma[exp]. This process flow is repeated for each illumination step in the PTC test. For instance, when five different exposure times are employed to form the images 10-14 in a conventional test, then the process flow in FIG. 4 is repeated five times and applied to data from each set of two frames needed to generate a particular image. If there are five different exposure times ($a_1$-$a_6$), then a total of five difference frames 54 are generated.

Figure 5:
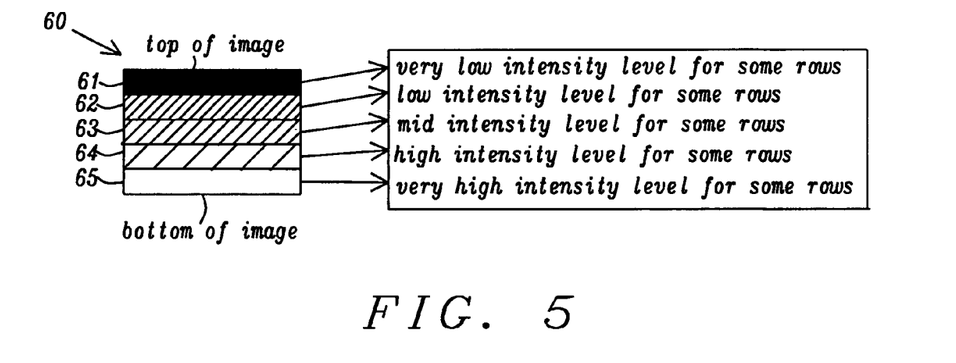
FIG. 5 is an image generated by a PTC test wherein two frames are produced by 5 different illumination intensity levels according to a method of the present invention.

Referring to FIG. 5, the inventors have discovered a new method of performing the PTC test that substantially reduces the time required for pixel testing. According to the exemplary embodiment of the present invention, an image may be generated that is comprised of five rectangular regions 61-65 wherein each region represents an output from a certain number of pixel rows in a sensor area being tested. The rectangular regions 61-65 result from illuminating the pixel rows for the same length of time but at five different intensity levels. For instance, region 61 is located at the top of the image 60 and results from an illumination at a very low intensity level $m_1$ of a first plurality of pixel rows. Similarly, region 62 results from an illumination at a low intensity level $m_2$ on a second plurality of pixels rows, and so forth through region 65. Regions 62-65 result from progressively greater illumination intensity levels $m_2$, $m_3$, $m_4$, and $m_5$, respectively, such that $m_5 > m_4 > m_3 > m_2 > m_1$ and $m_5$ essentially saturates the corresponding pixel region (fifth plurality of pixel rows) to produce a maximum output level and a substantially white image. Moreover, illumination intensity level $m_1$ produces a substantially black region 61 in image 60. For example, $m_2$ may be 2× greater than $m_1$, $m_3$ may be 3× greater than $m_1$, and $m_4$ may be 4× greater than $m_1$. Each region 61-65 results from an exposure of a certain plurality of pixel rows in the sensor area being tested. Note that the pixel regions do not have to be arranged in order of low to high intensity illumination level in the sensor area.

Alternatively, the image 60 may be comprised of a plurality of rectangular shaped regions, wherein the degree of brightness increases progressively from the bottom to the top of the image. In another embodiment, there may be "n" different illumination intensity levels each having an illumination time "t". In other words, a first plurality of pixels may be illuminated at an intensity level $m_1$, a second plurality of pixels may be illuminated at an intensity level $m_2$, a third plurality of pixels may be illuminated at an intensity level $m_3$, and so forth up to the nth plurality of pixels illuminated at an intensity level $m_n$ wherein $m_n > m_3 > m_2 > m_1$ and $m_n$ essentially saturates the nth plurality of pixels to produce a white image in the nth region of the image while $m_1$ produces a substantially black region in the first plurality of pixels. The relative values of the various illumination intensity levels may involve multipliers other than integers. Although the illumination intensity relationship $m_n > m_3 > m_2 > m_1$ is not required, it is preferred because more reliable results are obtained.

Figure 6:
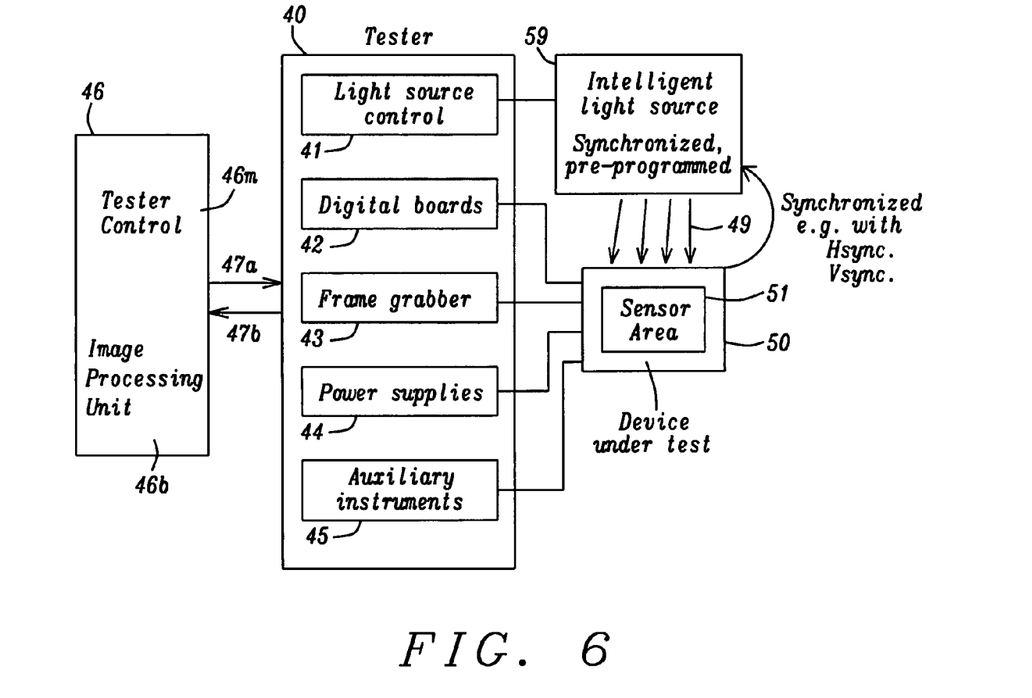
FIG. 6 is the test configuration in FIG. 3 wherein the tester control has been modified to include preprogramming information necessary to carry out the method of the present invention and an intelligent light source is employed for illumination.

Referring to FIG. 6, according to the present invention, the number of illumination steps and the intensity level of each step are transferred from the tester control section 46m of the process controller 46 in step 47a via the light source control 41 to an intelligent light source 59 that is capable of being pre-programmed with illumination settings and can be synchronized with the sensor device 50 by way of HSYNC and VSYNC signals, for example. Those skilled in the art will appreciate that each illumination step is used to generate a particular region 61-65 (FIG. 5). Therefore, the number of illumination steps is five (five different illumination intensity levels) in the exemplary embodiment. Optionally, the number of illumination steps may be any integer and preferably, an integer greater than 4 is selected if there are enough rows available in the sensor device. If the sensor device is relatively small and has only about 100 rows or less, then at least 4 to 6 illumination steps are recommended. For larger sensors of about 1024 or more rows, then as many as 32 different intensity steps may be used and the number of rows involved in each intensity step may be up to 32 or more. The method of this invention requires an "intelligent" light source as described in Dialog Semiconductor patent publication 2006/0038916 that is pre-programmable and can be synchronized with a sensor device. Earlier versions of illuminators in the prior art are limited with regard to illumination changes and are not synchronized with the sensor device.

It should be understood that the "n" different illuminations used to generate a first frame 50 must be repeated to produce a second frame 52 in order to calculate the (F2–F1) difference frame 54 in FIG. 4. Note also that the photo gate for each pixel is reset to a precharged state after each frame is generated.

In a preferred sequence of events, the PTC test according to the present invention comprises illumination each row of pixels in the sensor area for a constant time but with varying illumination intensity. The light source processing memory that includes the various light intensities to be utilized during testing is preprogrammed before the test begins. The light source control 41 is connected to data outputs in the sensor device 50 with hardware such as buffers or drivers in between for signal refreshing and level shifting. The sensor device 50 is streaming out data together with pixel clock, horizontal and vertical (image) SYNC signals during the testing process. When the tester control system 46 is ready to acquire a special illuminated image, the light source control 41 is put into an "active mode" and waits for incoming SYNC signals from the sensor device. The light source control 41 (and intelligent light source 59) now become synchronized with the sensor device 50. When the light source control 41 sees the VSYNC changing from low to high, for example, it initiates the pre-programmed sequence. Depending on the preprogrammed settings, the light source control 41 starts to count the number of occurring HSYNC signals where the number of HSYNC signals≧number of rows. The light source control continues to change the illumination intensity according to the number of HSYNC signals until the end of the preprogramming of the VSYNC signal from high to low, for example.

In an embodiment wherein the light source 41 is programmed to change the illumination intensity level after 10 HSYNC signals, for example, the number of occurring HSYNCs is counted and the illumination is changed after the $10^{th}$ occurring illumination. Then the counter in the light source 41 is reset and resumes counting HSYNCS until the next illumination change or until the VSYNC signal changes from high to low.

Each illumination step involves exposure of a certain number of rows of pixels in the sensor area 51. In one embodiment, region 61 is generated from an illumination of $x_1$ pixel rows, region 62 from illumination of $x_2$ pixel rows, region 63 from illumination of $x_3$ pixel rows, region 64 from illumination of $x_4$ pixel rows, and region 65 from illumination of $x_5$ pixel rows wherein $x_1$, $x_2$, $x_3$, $x_4$, $x_5$ are all integers and are equivalent. However, the present invention also encompasses an embodiment wherein one or more of the integers $x_1$-$x_5$ are unequal.

It is understood that each pixel in the sensor device structure (not shown) has a photo gate at the bottom of its light column that is charged with a certain voltage and is electrically connected to a charge integrator. The amount of photons incident on the photo gate is related to the amount of discharge from the photo gate. The amount of charge remaining at a photo gate after a certain illumination can be transferred to a storage node (capacitor) and read out by the image processing unit 46b (via the frame grabber 43) at a later time. The charge integrator in the sensor device generates an output based on the amount of charge received from the photo gate.

Figure 7:
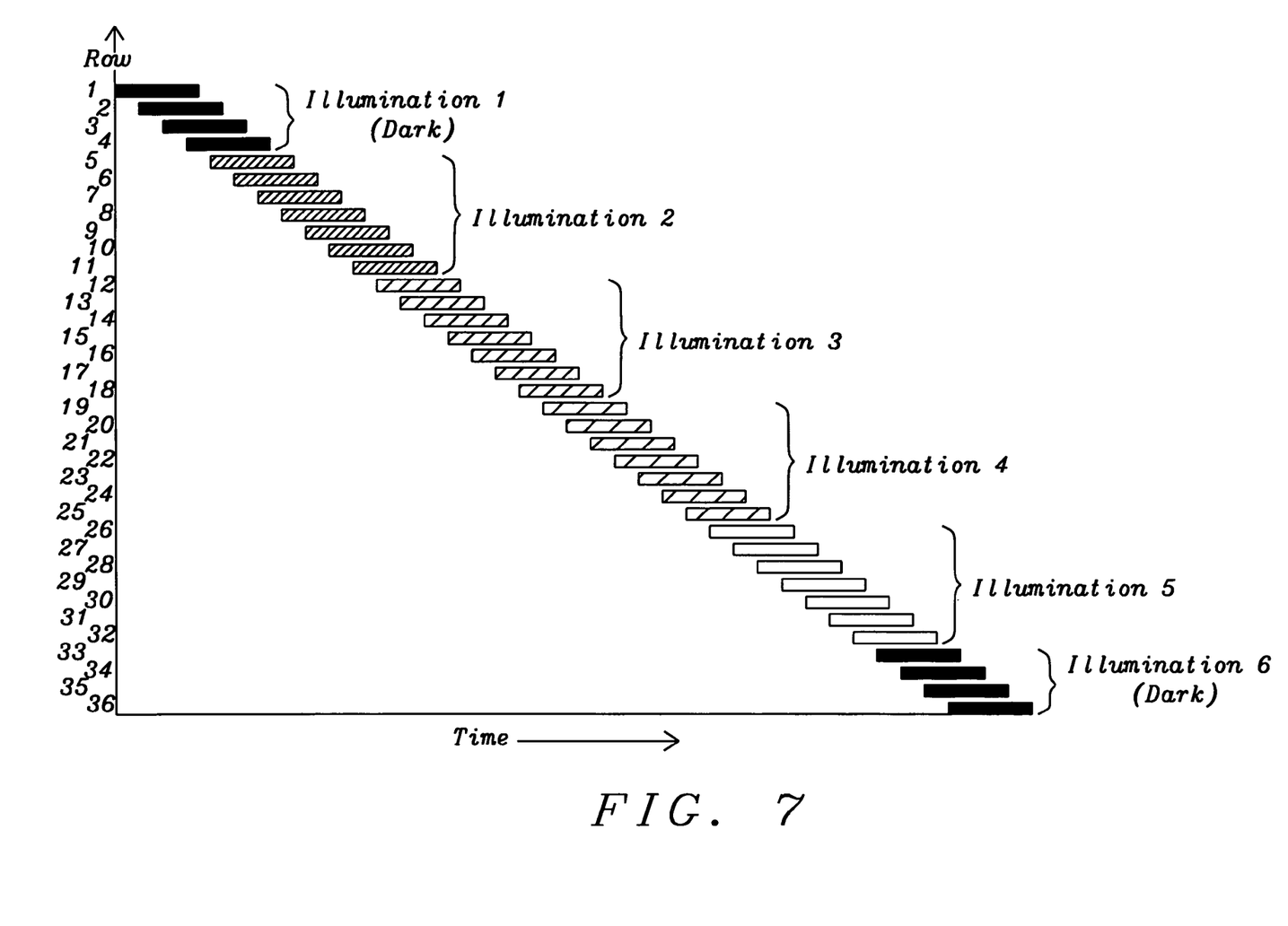
FIG. 7 is a graph that shows illuminator intensity plotted as a function of time according to the present invention.

Referring to FIG. 7, the exemplary embodiment comprises a PTC test method that has five different illumination intensity levels for testing an image sensor having 36 pixel rows. This illumination sequence represents a four row exposure. There are three rows of transition between each set of four rows at a different light intensity level. For example, the first four rows are illuminated at a very low illumination level (first light intensity) that is a substantially "dark". After row 4 exposure is stopped, row 5 is already illuminated to the dark for ¾th of its illumination time and is illuminated to a second light intensity level for only ¼th of its total illumination time. Row 6 is illuminated for one half of its illumination time to the dark and one half to the second light intensity level. Row 7 is illuminated for ¼th of its illumination time to the dark and ¾th to the second light intensity level. Rows 8 through 11 are all illuminated for a fixed time to the second light intensity level. Thereafter, the jumps to the third, fourth, and fifth light intensity levels follow a similar pattern. Therefore, rows 12-14 are a transition between light intensity level 2 and light intensity level 3, rows 19-21 are a transition between light intensity level 3 and light intensity level 4, and rows 26-28 are a transition between light intensity level 4 and light intensity level 5. The transition rows are more clearly evident in FIG. 9 where the illumination in the frame is shown for the same row numbers listed in FIG. 8 that depicts the illuminator sequence for light intensity vs. row number.

Rows 1-4 represent a first pixel region where a plurality of rows is illuminated for a time "t" and at a first light intensity $m_1$. Rows 8-11 represent a second pixel region where a plurality of rows is illuminated for a time "t" and at a second light intensity $m_2$. Rows 15-18 represent a third pixel region where a plurality of rows is illuminated for a time "t" and at a third light intensity $m_3$. Rows 22-25 represent a fourth pixel region where a plurality of rows is illuminated for a time "t" and at a fourth light intensity $m_4$. Rows 29-32 represent a fifth pixel region where a plurality of rows is illuminated for a time "t" and at a fifth light intensity $m_5$. Pixels in these five pixel regions are used to generate frames F1, F2, and (F2–F1) as depicted in FIG. 4. Furthermore, after the fifth pixel region is illuminated, the illuminator is switched back to the first intensity level for the final four rows. In effect, this enables the illuminator to be ready for the next illumination sequence that begins with a first intensity level. Note that the transition regions involving rows 5-7, 12-14, 19-21, 26-28, and 33-36 are not used for frame generation in the exemplary embodiment. However, the present invention does encompass an embodiment wherein the transition rows may also be used in averaging calculations provided an appropriate program for data manipulation is available.

It should be understood by those skilled in the art that for other embodiments where the plurality of pixel regions and number of illumination steps is greater than five, the accuracy of the PTC test may be increased because of the larger number of data points available to generate the difference frame (F2–F1), for example. Thus, for a multiple "s" row exposure involving "n" pixel regions, there are "s" rows in each of the "n" pixel regions that receive the same light intensity level during illumination. As a result, each frame F1, F2 would have "n" different light intensity regions. The number of transition rows between each pixel region depends on the number of rows in the sensor and the number of light intensity levels.

Figure 8:
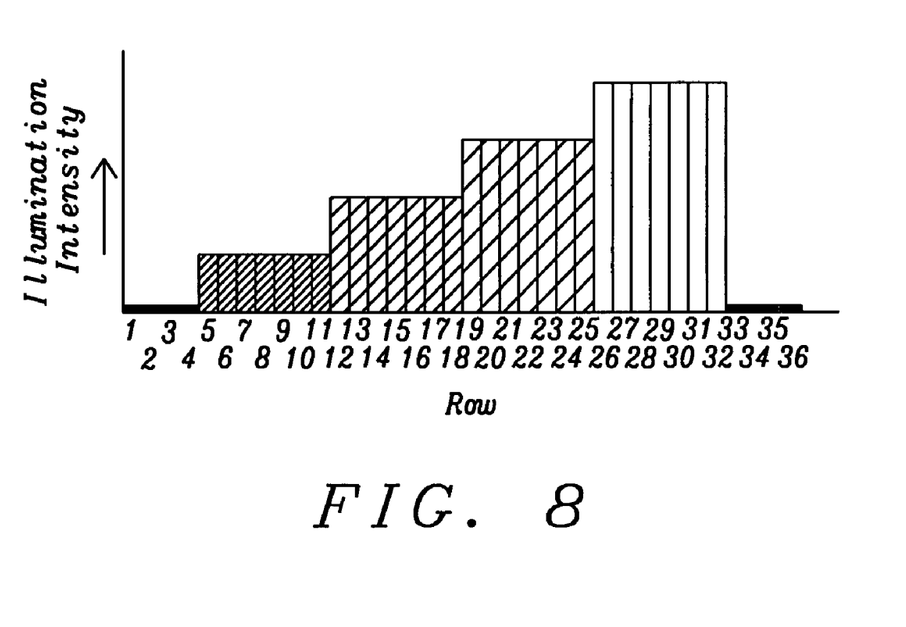
FIG. 8 is a graph that depicts the illumination intensity at the illuminator for each row exposed during the PTC test according to the present invention.
Figure 9:
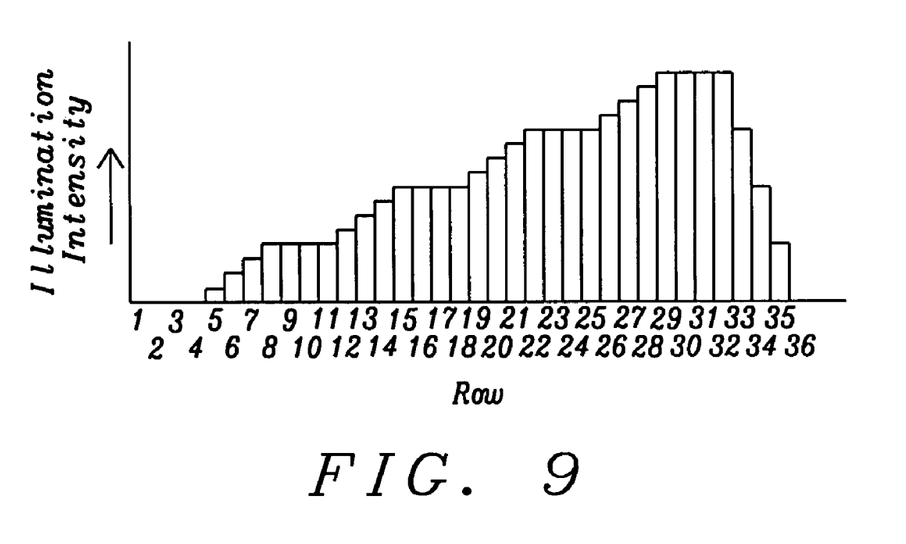
FIG. 9 is a graph showing the illumination intensity in the frame for each row exposed during the PTC test of the present invention.

Referring to FIG. 8, note that while the illuminator sequence indicates no illumination (dark illumination) for rows 33-36, row 33 is already illuminated to the fifth light intensity level for ¾th of its illumination time and is subjected to the dark for only ¼th of its total illumination time. Row 34 is illuminated for one half of its illumination time to the dark and one half to the fifth light intensity level. Row 35 is illuminated for ¼th of its illumination time to the fifth light intensity and ¾th to the dark (first light intensity level). Only row 36 is illuminated to the first intensity level (dark) for its entire illumination time. In other words, since this method involves a four row exposure, the illumination in the frame for each row in FIG. 9 (except for rows 1-3) is an average of the row and the light intensity level for the three previous rows found in FIG. 8. However, the present invention also encompasses other multiple row exposures such as five row exposure, for example.

A total of 2 frames are required to test each sensor device according to the PTC test of the present invention. The test method described herein achieves a substantial savings in time and cost for image sensor testing compared with prior art methods where a total of 10 frames would be needed to complete a PTC test that involves 5 different exposure levels. Not only is data acquisition faster than before but data processing is faster since calculations are necessary for substantially fewer frames than in the prior art. In an embodiment where the number of light intensity levels is greater than five, test time reduction will be even greater than fivefold and a more accurate PTC result will be obtained than when only 5 illumination levels are employed. The method of the present invention can be performed with existing equipment and using available programs for light source control and synchronization.

While this invention has been particularly shown and described with reference to, the preferred embodiment thereof, it will be understood by those skilled in the art that various changes in form and details may be made without departing from the spirit and scope of this invention.

We claim:

1. A method for photon transfer curve (PTC) testing to determine pixel reliability in an image sensor device, comprising:
    (a) providing a sensor array having a plurality of pixel rows and columns formed thereon wherein each pixel is in a charged state;
    (b) illuminating the sensor array with a uniform light source such that a first plurality of $x_1$ pixels in a first region are illuminated at a first light intensity level $m_1$ in a first step, a second plurality of $x_2$ pixels in a second region are illuminated at a second light intensity level $m_2$ in a second step, and so forth up to an nth plurality of $x_n$ pixels in an nth region illuminated at a light intensity level $m_n$ in an nth step wherein $x_1, x_2, \ldots x_n$ are integers, $m_n > m_2 > m_1$, and the length of each step is a constant time "t", said illuminating the sensor array produces a result comprising:
        (1) an intensity level $m_1$ in a first plurality of pixel rows, an intensity $m_2$ in a second plurality of pixel rows, and so forth up to an intensity level $m_n$ in an nth plurality of pixel rows; and
        (2) a first transition pixel region with a variable intensity between the first plurality of pixel rows and the second plurality of pixel rows, a second transition pixel region with a variable intensity between the second plurality of pixel rows and a third plurality of pixel rows up to an (n−1)th transition pixel region with a variable intensity between an (n−1)th plurality of pixel rows and the nth plurality of pixel rows;
    (c) sending residual charge information for each pixel in the "n" plurality of pixel rows to an image processor where an image for a first frame (F1) is generated, said image has a top and bottom and two sides;
    (d) resetting the plurality of pixel rows and columns to the same charged state as in step (a); and
    (e) repeating steps (b)-(c) in succession to form an image having a top and bottom and two sides for a second frame (F2) in said image processor wherein illumination values for F1, F2, and (F2-F1) may be calculated and a difference frame (F2-F1) determined.

2. The method of claim 1 wherein the light intensity level $m_n$ for the nth plurality of pixels essentially saturates said nth plurality of pixels to produce a white region in said images for the F1 and F2 frames.

3. The method of claim 2 wherein the light intensity level $m_1$ for the first plurality of pixels produces a substantially black region in said images for the F1 and F2 frames.

4. The method of claim 3 wherein the substantially black region is formed at the top of said images and the essentially white region is formed at the bottom of said images and the illuminations having light intensity levels between $t_1$ and $t_n$ produce successively brighter regions between the top and bottom of said images wherein the brightness increases as the light intensity level increases in magnitude.

5. The method of claim 1 wherein step (b) comprises a multiple "s" row exposure wherein "s" rows in each of the "n" pixel regions are illuminated to the same light intensity level.

6. The method of claim 5 wherein an illumination sequence that comprises the number of illumination steps, the number of pixels in each pixel region, and the number of "s" rows in each pixel region is preprogrammed into a light control element in said test system that controls the uniform light source.

7. The method of claim 6 wherein sending residual charge information for each pixel to an image processor in step (c) occurs through a frame grabber component of a PTC test system.

8. The method of claim 1 wherein $x_1 = x_2 = x_n$.

9. The method of claim 1 wherein one or more of the values $x_2, \ldots x_n$ are unequal to the value $x_1$.

10. The method of claim 1 wherein the uniform light source is an intelligent light source that is capable of being pre-programmed with illumination sequence settings and can be synchronized with said image sensor device.

11. The method of claim 10 wherein the intelligent light source is synchronized with the image sensor device using HSYNC and VSYNC signals.

12. A method for photon transfer curve testing to determine pixel reliability in an image sensor device, comprising:
   (a) providing a sensor array having a plurality of pixels rows and columns formed thereon wherein each pixel is in a charged state;
   (b) illuminating the sensor array with a uniform light source such that a first plurality of $x_1$ pixel rows are illuminated at a first intensity level $m_1$ in a first step, a second plurality of $x_2$ pixel rows are illuminated at a second intensity level $m_2$ in a second step, and so forth up to an nth plurality of $x_n$ pixel rows illuminated at an intensity level $m_n$ in an nth step wherein $x_1$-$x_n$ are integers, and all rows are illuminated for a constant time "t", said illuminating the sensor array produces a result comprising:
      (1) an intensity level $m_1$ in a first plurality of pixel rows, an intensity $m_2$ in a second plurality of pixel rows, and so forth up to an intensity level $m_n$ in an nth plurality of pixel rows; and
      (2) a first transition pixel region with a variable intensity between the first plurality of pixel rows and the second plurality of pixel rows, a second transition pixel region with a variable intensity between the second plurality of pixel rows and a third plurality of pixel rows up to an (n−1)th transition pixel region with a variable intensity between an (n−1)th plurality of pixel rows and the nth plurality of pixel rows;
   (c) sending residual charge information for each pixel in said "n" plurality of pixel rows to an image processor where an image for a first frame (F1) is generated, said image has a top and bottom;
   (d) resetting the plurality of pixel rows and columns to the same charged state as in step (a);
   (e) repeating steps (b)-(c) in succession to form an image having a top and bottom for a second frame (F2) in said image processor wherein illumination values for F1, F2, and (F2-F1) may be calculated and a difference frame (F2-F1) determined.

13. The method of claim 12 wherein the light intensity level $m_n$ for the nth plurality of pixel rows essentially saturates said nth plurality of pixel rows to produce a white region in said images for the F1 and F2 frames and wherein the light intensity level $m_1$ for the first plurality of pixel rows produces a substantially black region in said images for the F1 and F2 frames.

14. The method of claim 13 wherein the substantially black region is formed at the top of said images and the essentially white region is formed at the bottom of said images and the illuminations having light intensity levels between $m_1$ and $m_n$ produce successively brighter regions between the top and bottom of said images wherein the brightness increases as the light intensity level increases in magnitude.

15. The method of claim 12 wherein step (b) comprises a multiple "s" row exposure wherein "s" rows in each of the "n" plurality of pixel rows are illuminated at the same light intensity level.

16. The method of claim 12 wherein $x_1 = x_2 = x_n$.

17. The method of claim 12 wherein one or more of the values $x_2, \ldots x_n$ are unequal to the value $x_1$.

18. The method of claim 15 wherein the uniform light source is an intelligent light source that is capable of being pre-programmed with illumination sequence settings and can be synchronized with said image sensor device.

19. The method of claim 18 wherein the intelligent light source is synchronized with the image sensor device using HSYNC and VSYNC signals.

20. The method of claim 12 wherein sending residual charge information for each pixel to an image processor in step (c) occurs through a frame grabber component of a PTC test system.

* * * * *